(12) United States Patent
Sahin et al.

(10) Patent No.: US 10,942,264 B2
(45) Date of Patent: Mar. 9, 2021

(54) OBJECT POSITION ESTIMATION

(71) Applicant: QUALCOMM Incorporated, San Diego, CA (US)

(72) Inventors: Mustafa Emin Sahin, San Diego, CA (US); Roberto Rimini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 16/154,504

(22) Filed: Oct. 8, 2018

(65) Prior Publication Data

US 2020/0110165 A1 Apr. 9, 2020

(51) Int. Cl.
*G01S 13/46* (2006.01)
*G01S 13/87* (2006.01)

(52) U.S. Cl.
CPC ............ *G01S 13/46* (2013.01); *G01S 13/872* (2013.01); *G01S 2013/466* (2013.01)

(58) Field of Classification Search
CPC combination set(s) only.
See application file for complete search history.

(56) References Cited

U.S. PATENT DOCUMENTS

| | | | |
|---|---|---|---|
| 10,327,276 B2* | 6/2019 | Muller | H04W 24/10 |
| 2006/0139034 A1 | 6/2006 | Nevermann | |
| 2009/0167607 A1* | 7/2009 | Holder | G01S 13/003 |
| | | | 342/453 |
| 2012/0127021 A1 | 5/2012 | Gravelle et al. | |
| 2013/0267181 A1 | 10/2013 | Ayatollahi et al. | |
| 2015/0181553 A1* | 6/2015 | Segev | G01S 5/14 |
| | | | 455/456.1 |
| 2017/0023692 A1* | 1/2017 | Petherick | G01V 3/12 |
| 2017/0031013 A1* | 2/2017 | Halbert | G01S 7/415 |
| 2017/0184699 A1* | 6/2017 | Honma | G01S 13/003 |
| 2017/0188248 A1* | 6/2017 | Muller | H04W 76/15 |
| 2017/0254898 A1* | 9/2017 | Park | G01S 13/89 |
| 2019/0272757 A1* | 9/2019 | Grabbe | G08G 1/164 |
| 2019/0341993 A1* | 11/2019 | Karabinis | H04B 17/102 |
| 2019/0346558 A1* | 11/2019 | Bialer | G01S 13/003 |
| 2020/0064444 A1* | 2/2020 | Regani | G01S 13/931 |

FOREIGN PATENT DOCUMENTS

CN 107450067 A 12/2017

OTHER PUBLICATIONS

Hu P., et al., "PCASA: Proximity based Continuous and Secure Authentication of Personal Devices", 2017 14th Annual IEEE International Conference on Sensing, Communication, and Networking (SECON), 2017, 9 pages.

* cited by examiner

*Primary Examiner* — Mamadou L Diallo
(74) *Attorney, Agent, or Firm* — Thien T. Nguyen (57) ABSTRACT

Some disclosed devices include a plurality of transmitter/receiver pairs configured for transmitting and receiving millimeter wave (mmWave) radar and a control system configured for obtaining, via a first transmitter/receiver pair, a first round-trip time for a first reflection from an object proximate the apparatus. The control system may be configured for obtaining, via a second transmitter/receiver pair, a second round-trip time for a second reflection from the object and for determining a position of the object based, at least in part, on the first round-trip time and the second round-trip time.

36 Claims, 6 Drawing Sheets

OBJECT POSITION ESTIMATION

TECHNICAL FIELD

This disclosure relates generally to devices and methods for position estimation, including but not limited to position estimation that is enabled via millimeter wave (mmWave) transmitter/receiver pairs.

DESCRIPTION OF THE RELATED TECHNOLOGY

Estimating an object's position relative to a cellular telephone or a similar device is a desirable capability. A position estimation method could, for example, be used to detect the positions of human body parts in order to comply with the Maximum Permissible Exposure (MPE) requirements of the Federal Communications Commission (FCC). Although existing position estimation methods have merit, it would be desirable to develop improved methods and devices.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. The apparatus may include a plurality of transmitter/receiver pairs and a control system that is configured for communication with the plurality of transmitter/receiver pairs. In some examples, the transmitter/receiver pairs may be configured to transmit and receive millimeter wave (mmWave) signals. In some implementations, a mobile device may be, or may include, the apparatus. For example, a mobile device may include an apparatus as disclosed herein.

The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system may be configured for obtaining, via a first transmitter/receiver pair, a first round-trip time for a first reflection from an object proximate the apparatus and for obtaining, via a second transmitter/receiver pair, a second round-trip time for a second reflection from the object. The control system may be configured for determining a position of the object based, at least in part, on the first round-trip time and the second round-trip time.

In some implementations, the control system may be configured for determining a first ellipse based on the first round-trip time, for determining a second ellipse based on the second round-trip time and for determining an intersection of the first ellipse and the second ellipse. The position of the object may be based, at least in part, on the intersection of the first ellipse and the second ellipse. According to some such implementations, the control system may be configured for obtaining, via a third transmitter/receiver pair, a third round-trip time for a third reflection from the object and for determining the position of the object based, at least in part, on the first round-trip time, the second round-trip time and the third round-trip time.

According to some examples, the control system may be configured for determining a first ellipsoid based on the first round-trip time, determining a second ellipsoid based on the second round-trip time, determining a third ellipsoid based on the third round-trip time and determining an intersection of the first ellipsoid, the second ellipsoid and the third ellipsoid. The position of the object may be based, at least in part, on the intersection of the first ellipsoid, the second ellipsoid and the third ellipsoid.

According to some such examples, the intersection of the first ellipsoid, the second ellipsoid and the third ellipsoid may indicate two potential positions of the object. The control system may be configured for determining a midpoint between the two potential positions of the object and for determining that the midpoint is the position of the object.

In some implementations, one or more of the transmitter/receiver pairs may include a first transmitter residing in a first antenna module and a first receiver in a second antenna module. In some such implementations, the first antenna module may include two or more transmitters and the second antenna module may include two or more receivers.

According to some examples, the first transmitter/receiver pair may include a first transmitter and a first receiver. The second transmitter/receiver pair may include the first transmitter and a second receiver. In some alternative implementations wherein the first transmitter/receiver pair includes a first transmitter and a first receiver, the second transmitter/receiver pair may include a second transmitter and the first receiver.

In some implementations, the control system may be configured for controlling one or more of the transmitter/receiver pairs for communication with one or more devices over a network. According to some such examples, the apparatus may be, or may include, a cellular telephone.

Still other innovative aspects of the subject matter described in this disclosure can be implemented in an object position estimation method. The method may involve obtaining, via a first transmitter/receiver pair of an apparatus, a first round-trip time for a first reflection from an object proximate the apparatus and obtaining, via a second transmitter/receiver pair of the apparatus, a second round-trip time for a second reflection from the object. The method may involve determining a position of the object based, at least in part, on the first round-trip time and the second round-trip time. According to some examples, the first reflection and/or the second reflection may be, or may involve, a reflection of mmWave radar.

In some instances, the second round-trip time may be obtained within a threshold time of obtaining the first round-trip time. In some such examples, the threshold time may be in the range of one hundred microseconds to one millisecond.

In some implementations, the method may involve determining a first ellipse based on the first round-trip time, determining a second ellipse based on the second round-trip time and determining an intersection of the first ellipse and the second ellipse. The position of the object may be based, at least in part, on the intersection of the first ellipse and the second ellipse.

According to some examples, the method may involve obtaining, via a third transmitter/receiver pair of the apparatus, a third round-trip time for a third reflection from the object and determining the position of the object based, at least in part, on the first round-trip time, the second round-trip time and the third round-trip time. According to some such examples, the method may involve determining a first ellipsoid based on the first round-trip time, determining a second ellipsoid based on the second round-trip time, determining a third ellipsoid based on the third round-trip time and determining an intersection of the first ellipsoid, the second ellipsoid and the third ellipsoid. The position of the object may be based, at least in part, on the intersection of the first ellipsoid, the second ellipsoid and the third ellipsoid.

The intersection of the first ellipsoid, the second ellipsoid and the third ellipsoid may indicate two potential positions of the object. The method may involve determining a midpoint between the two potential positions of the object and determining that the midpoint is the position of the object.

In some implementations, obtaining at least one of the first round-trip time or the second round-trip time may involve transmitting from a first antenna module and receiving via a second antenna module. In some examples, obtaining at least one of the first round-trip time or the second round-trip time may involve transmitting from a first antenna module that includes two or more transmitters and receiving via a second antenna module that includes two or more receivers.

According to some examples, obtaining the first round-trip time may involve transmitting from a first transmitter of a first antenna module and receiving via a first receiver of a second antenna module. Obtaining the second round-trip time may involve transmitting from the first transmitter of the first antenna module and receiving via a second receiver of the second antenna module.

In some implementations, obtaining the first round-trip time may involve transmitting from a first transmitter of a first antenna module and receiving via a first receiver of the first antenna module. Obtaining the second round-trip time may involve transmitting from a first transmitter of a second antenna module and receiving via the first receiver of the first antenna module.

According to some examples, the method may involve controlling one or more of the transmitter/receiver pairs for communication with one or more devices over a network. Some such examples may involve controlling the apparatus to provide cellular telephone functionality.

Some or all of the operations, functions and/or methods described herein may be performed by one or more devices according to instructions (e.g., software) stored on non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in a non-transitory medium having software stored thereon.

For example, the software may include instructions for controlling one or more devices to perform an object position estimation method. The method may involve obtaining, via a first transmitter/receiver pair of an apparatus, a first round-trip time for a first reflection from an object proximate the apparatus and obtaining, via a second transmitter/receiver pair of the apparatus, a second round-trip time for a second reflection from the object. The method may involve determining a position of the object based, at least in part, on the first round-trip time and the second round-trip time. According to some examples, the first reflection and/or the second reflection may be, or may involve, a reflection of mmWave radar.

In some instances, the second round-trip time may be obtained within a threshold time of obtaining the first round-trip time. In some such examples, the threshold time may be in the range of one hundred microseconds to one millisecond.

In some implementations, the method may involve determining a first ellipse based on the first round-trip time, determining a second ellipse based on the second round-trip time and determining an intersection of the first ellipse and the second ellipse. The position of the object may be based, at least in part, on the intersection of the first ellipse and the second ellipse.

According to some examples, the method may involve obtaining, via a third transmitter/receiver pair of the apparatus, a third round-trip time for a third reflection from the object and determining the position of the object based, at least in part, on the first round-trip time, the second round-trip time and the third round-trip time. According to some such examples, the method may involve determining a first ellipsoid based on the first round-trip time, determining a second ellipsoid based on the second round-trip time, determining a third ellipsoid based on the third round-trip time and determining an intersection of the first ellipsoid, the second ellipsoid and the third ellipsoid. The position of the object may be based, at least in part, on the intersection of the first ellipsoid, the second ellipsoid and the third ellipsoid.

The intersection of the first ellipsoid, the second ellipsoid and the third ellipsoid may indicate two potential positions of the object. The method may involve determining a midpoint between the two potential positions of the object and determining that the midpoint is the position of the object.

In some implementations, obtaining at least one of the first round-trip time or the second round-trip time may involve transmitting from a first antenna module and receiving via a second antenna module. In some examples, obtaining at least one of the first round-trip time or the second round-trip time may involve transmitting from a first antenna module that includes two or more transmitters and receiving via a second antenna module that includes two or more receivers.

According to some examples, obtaining the first round-trip time may involve transmitting from a first transmitter of a first antenna module and receiving via a first receiver of a second antenna module. Obtaining the second round-trip time may involve transmitting from the first transmitter of the first antenna module and receiving via a second receiver of the second antenna module.

In some implementations, obtaining the first round-trip time may involve transmitting from a first transmitter of a first antenna module and receiving via a first receiver of the first antenna module. Obtaining the second round-trip time may involve transmitting from a first transmitter of a second antenna module and receiving via the first receiver of the first antenna module.

According to some examples, the method may involve controlling one or more of the transmitter/receiver pairs for communication with one or more devices over a network. Some such examples may involve controlling the apparatus to provide cellular telephone functionality.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be

DETAILED DESCRIPTION

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a plurality of transmitter/receiver pairs such as those disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Some disclosed devices are configured for object position estimation via transmitter/receiver pairs that are configured to transmit and receive millimeter wave (mmWave) signals. In some examples, the apparatus may also be configured for 5G communication via the transmitter/receiver pairs. For example, the apparatus may be a cellular telephone or a similar device.

To find an object's distance using mmWave radar, employing a transmitter/receiver pair of a single antenna module would be desirable. Using the round-trip time (RTT) between the transmitter and the receiver would readily yield the object's distance:

$$d_1 = c \cdot RTT/2 \quad \text{(Equation 1)}$$

In Equation 1, $d_1$ represents the distance between the antenna module and c represents the speed of light.

However, in mmWave signaling there is a very strong mutual coupling between closely-located transmitter and receiver antennas (such as patch antennas in the same module). The mutually-coupled signal can be ~30 dB stronger than the signal reflected from an object. Therefore, in practice, it can be very difficult to detect the reflected signal in the presence of mutually coupled signal.

Some disclosed devices that are configured for object position estimation via transmitter/receiver pairs include transmitter/receiver antenna pairs that are sufficiently separated from one another to minimize the impact of mutual coupling. For example, the transmitter of a transmitter/receiver pair may be located in one antenna module of the device and the receiver of the transmitter/receiver pair may be located in another antenna module of the device. Using a single transmitter/receiver pair, the possible range of the object (also referred to herein as "the reflector") characterizes an elliptical path, but the exact position is not univocally determined. Using more than one transmitter/receiver pair can resolve the position ambiguity in two dimensions. Using additional transmitter/receiver pairs can resolve the position ambiguity in three dimensions.

Particular implementations of the subject matter described in this disclosure may be implemented to realize one or more of the following potential advantages. Some disclosed implementations use transmitters and receivers for object position determination that are also used for wireless communication. Such transmitters and receivers may be used for object position determination without requiring additional hardware that is dedicated to object position determination. Using transmitter/receiver antenna pairs that are sufficiently separated from one another can minimize the impact of mutual coupling. Some disclosed position estimation methods may be used to detect the positions of human body parts for compliance with the MPE requirements of the FCC.

Figure 1:
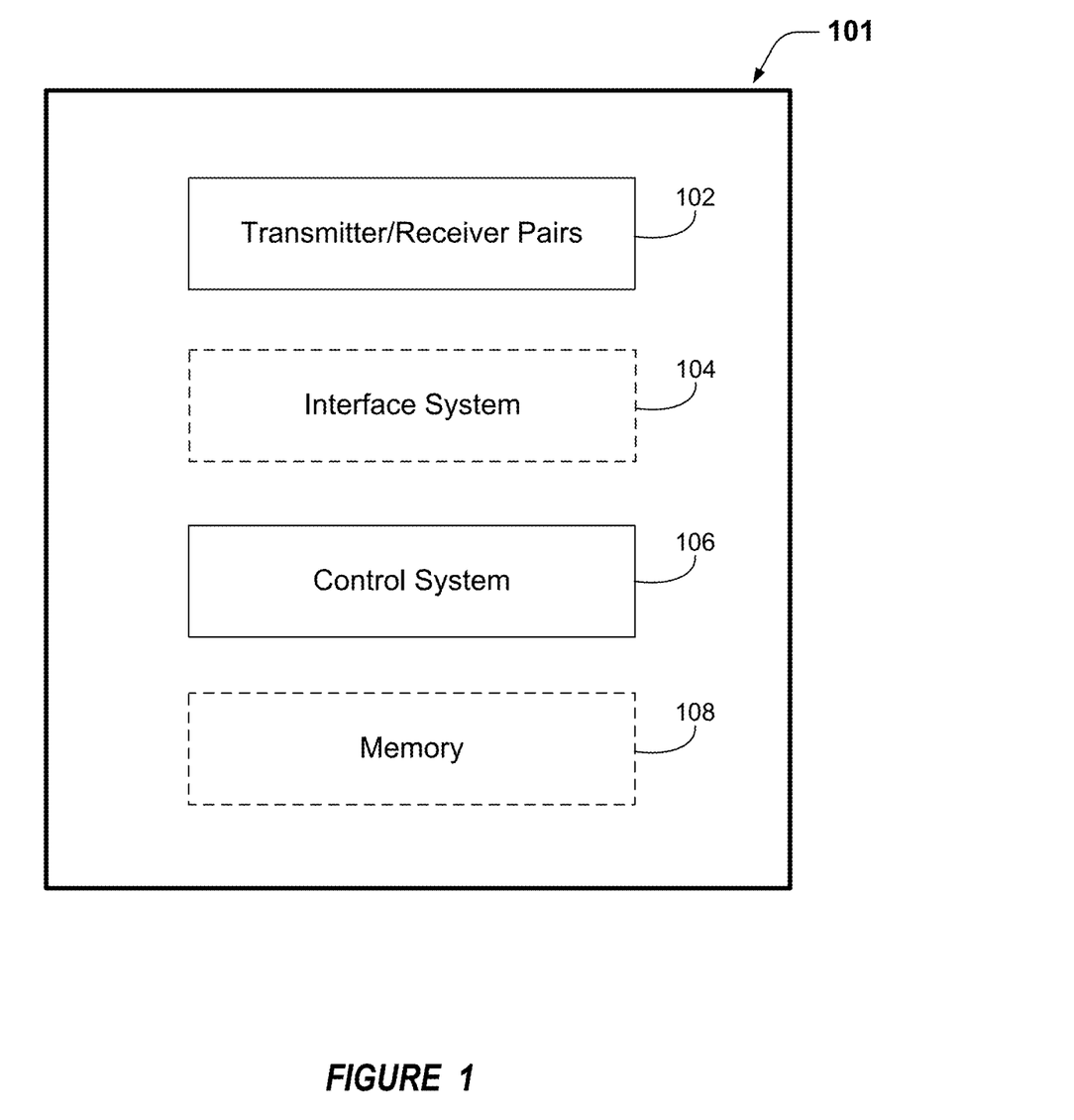
FIG. 1 is a block diagram that shows example components of an apparatus according to some disclosed implementations.

FIG. 1 is a block diagram that shows example components of an apparatus according to some disclosed implementations. In this example, the apparatus 101 includes a plurality of transmitter/receiver pairs 102 and a control system 106. Some examples are described below. Some implementations of the apparatus 101 may include an interface system 104. In some examples, the apparatus 101 may include a memory 108, in addition to any memory that the control system 106 may include.

Various examples of transmitter/receiver pairs 102 are disclosed herein. In some implementations the plurality of transmitter/receiver pairs 102 may be implemented via antennas that are configured to transmit and/or receive millimeter wave (mmWave) signals. Some disclosed transmitter/receiver pairs 102 may be configurable for use in 5G communication systems. For example, some such antennas may be configured for beam steering, e.g., according to instructions from the control system 106. Some disclosed transmitter/receiver pairs 102 may be microstrip antennas (a/k/a "patch" antennas), which can be printed directly onto a circuit board.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 101 may have a memory system that includes one or more memory devices, though the memory system 108 is shown as an optional element in FIG. 1. The control system 106 may be capable of receiving and processing data from the plurality of transmitter/receiver pairs 102, e.g., as described below. In some implementations, functionality of the control system 106 may be partitioned between one or more controllers or processors, such as a dedicated sensor controller and an applications processor of a mobile device.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and the optional memory system 108, one or more interfaces between the control system 106 and the plurality of transmitter/receiver pairs 102 and/or one or more interfaces between the control system 106 and one or more external device interfaces (e.g., ports or applications processors).

The interface system 104 may be configured to provide communication (which may include wired or wireless communication, such as electrical communication, radio communication, etc.) between components of the apparatus 101. In some such examples, the interface system 104 may be configured to provide communication between the control system 106 and the plurality of transmitter/receiver pairs 102. According to some such examples, a portion of the interface system 104 may couple at least a portion of the control system 106 to the plurality of transmitter/receiver pairs 102, e.g., via electrically conducting material. According to some examples, the interface system 104 may be configured to provide communication between the apparatus 101 and other devices and/or human beings. In some such examples, the interface system 104 may include one or more user interfaces. The interface system 104 may, in some examples, include one or more network interfaces and/or one or more external device interfaces (such as one or more universal serial bus (USB) interfaces).

The apparatus 101 may be used in a variety of different contexts, some examples of which are disclosed herein. For example, in some implementations a mobile device may include at least a portion of the apparatus 101. The control system 106 may be configured for controlling one or more of the transmitter/receiver pairs 102 for communication with one or more devices over a network, such as a cellular telephone network, a local area network and/or the Internet. Accordingly, the control system 106 may be configured for controlling the apparatus, including but not limited to one or more of the transmitter/receiver pairs 102, to provide cellular telephone functionality.

In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone or a tablet computer). The interface system 104 also may, in some such examples, reside in more than one device.

Figure 2:
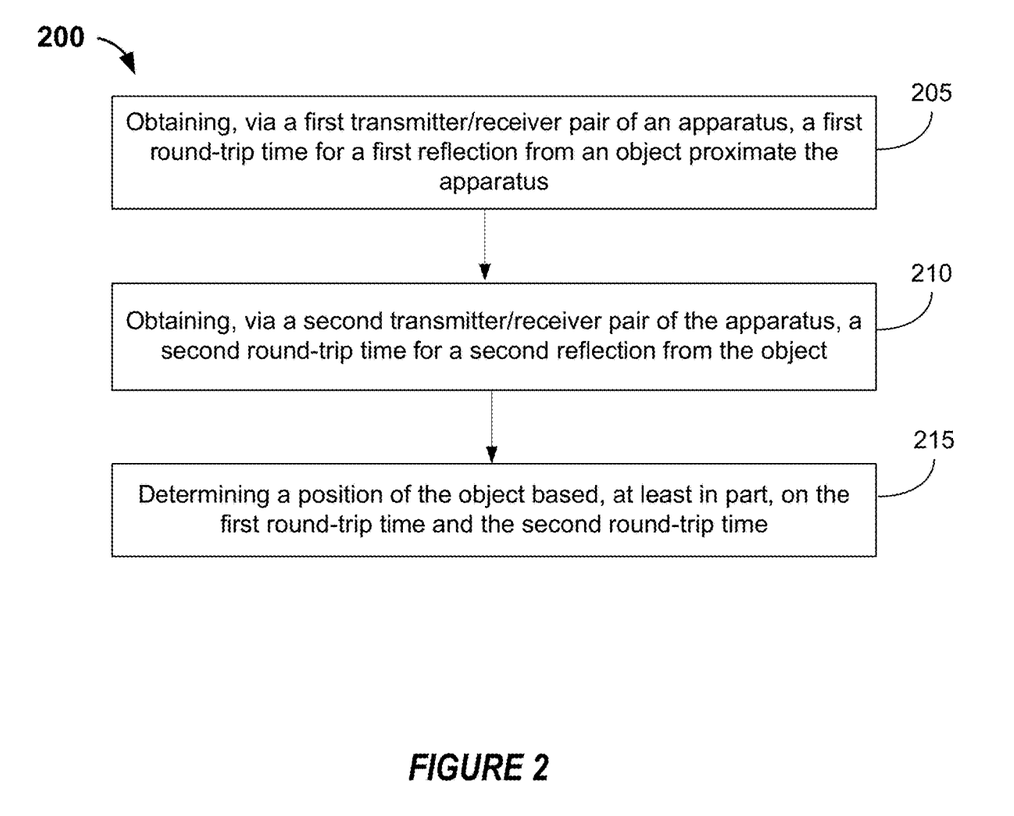
FIG. 2 is a flow diagram that shows blocks of a method according to one example.

FIG. 2 is a flow diagram that shows blocks of a method according to one example. The method 200 may, for example, be implemented at least in part by an apparatus such as that shown in FIG. 1 or one of the examples described below, having a plurality of transmitter/receiver pairs and a control system (such as the control system 106) that includes one or more processors and one or more non-transitory memory devices. As with other disclosed methods, the blocks of method 200 are not necessarily performed in the order shown in FIG. 2. Moreover, alternative methods may include more or fewer blocks.

According to this example, block 205 involves obtaining, via a first transmitter/receiver pair, a first round-trip time for a first reflection from an object proximate the apparatus. The first transmitter/receiver pair may be configured for transmitting and receiving mmWave radar signals. The transmitter/receiver antenna pairs may be sufficiently separated from one another to minimize the impact of mutual coupling. For example, the transmitter of a transmitter/receiver pair may be located in one antenna module of a device and the receiver of the transmitter/receiver pair may be located in another antenna module of the device.

In this example block 210 involves obtaining, via a second transmitter/receiver pair, a second round-trip time for a second reflection from the object. The second transmitter/receiver pair may be configured for transmitting and receiving mmWave radar signals. Here, block 215 involves determining a position of the object based, at least in part, on the first round-trip time and the second round-trip time. In some instances, block 215 may involve determining a first ellipse based on the first round-trip time, determining a second ellipse based on the second round-trip time and determining an intersection of the first ellipse and the second ellipse. The position of the object is based, at least in part, on the intersection of the first ellipse and the second ellipse. Some examples and further details regarding block 215 are described below.

According to some implementations, the second round-trip time may be obtained within a predetermined time interval, which also may be referred to herein as a "threshold time," of obtaining the first round-trip time. The threshold time may, in some examples, be in the range of 1 millisecond or less. For example, the threshold time may be in the range of one hundred microseconds to one millisecond.

Figure 3:
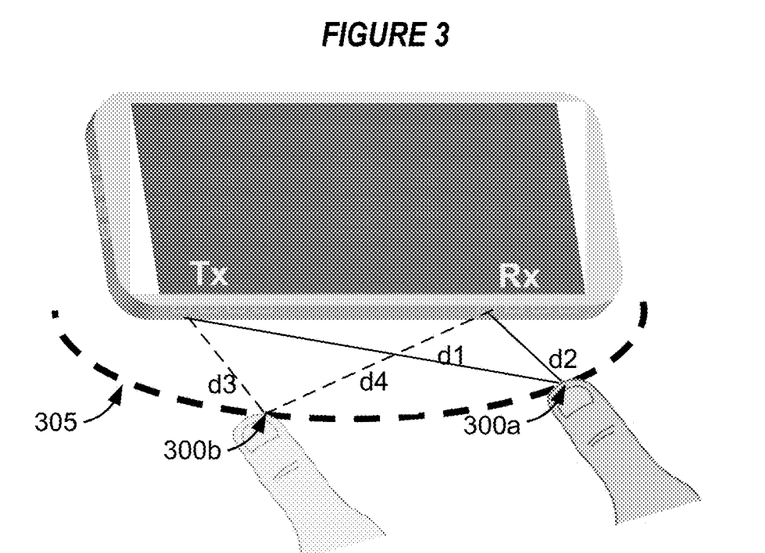
FIG. 3 shows an example of possible locations of an object based on a single round-trip time of a reflection from an object proximate an apparatus.

FIG. 3 shows an example of possible locations of an object based on a single round-trip time of a reflection from an object proximate an apparatus. In this example, the object is a digit. Here, a reflection from the object (also referred to herein as "the reflector") at position 300a corresponds with the distance d1+d2 and a reflection from the object at position 300b corresponds with the distance d3+d4. In this example, the distance d1+d2 equals the distance d3+d4, and also equals the distance corresponding to a reflection from an object positioned at any point on the ellipse 305.

Accordingly, as shown in FIG. 3, using a single transmitter/receiver pair, the possible range of the object spans/defines an elliptical curve, but the exact position of the object will not be unambiguously determined. Using more than one transmitter/receiver pair can resolve the position ambiguity in two dimensions.

Figure 4:
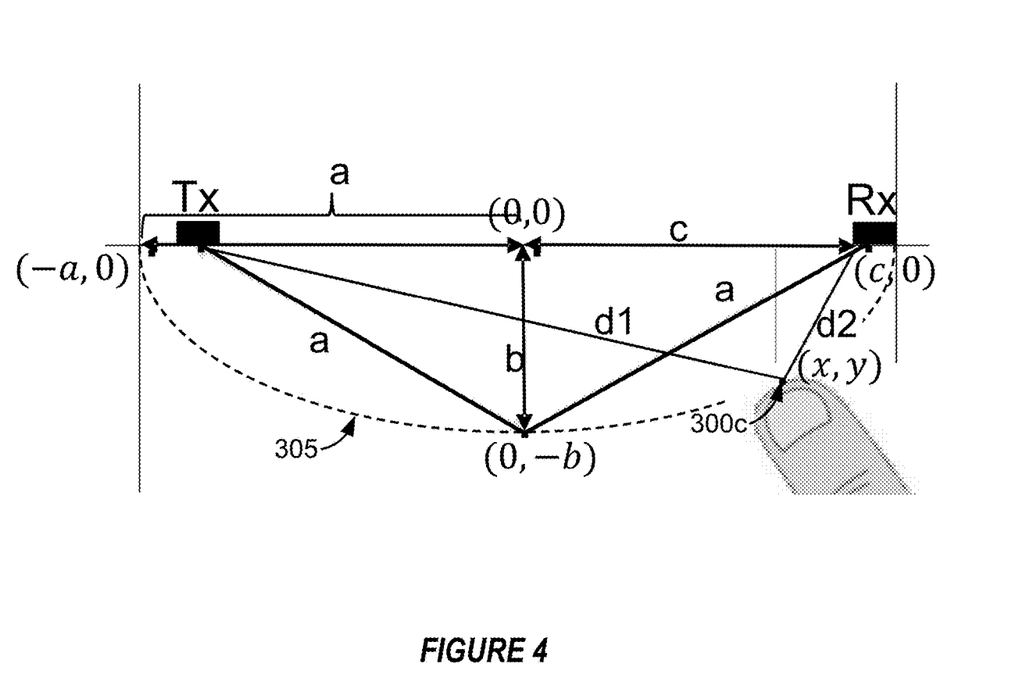
FIG. 4 illustrates the geometrical relationship between a transmitter/receiver pair and a reflective object according to one example.

FIG. 4 illustrates the geometrical relationship between a transmitter/receiver pair and a reflective object according to one example. According to this example, the origin (0,0) is at the midpoint of a transmitter/receiver pair. In this example, α represents half the length of the major axis of ellipse 305 and b represents half the length of the minor axis of ellipse 305. Here, c represents the distance from the origin to the transmitter or the receiver. In this instance, a reflection from the object at any position (x,y) on the ellipse 305 corresponds with the distance d1+d2. It may be observed that:

$$2\alpha = d1 + d2 \quad \text{(Equation 2)}$$

Following is an equation that defines a position (x,y) on an ellipse:

$$\frac{x^2}{a^2} + \frac{y^2}{b^2} = 1 \quad \text{(Equation 3)}$$

The relationship between α, b and c may be defined according to the Pythagorean theorem:

$$\alpha^2 = b^2 + c^2 \quad \text{(Equation 4)}$$

For a given arrangement of the transmitter and receiver, c is known. The value of α may be determined according to Equation 2 given that d1+d2 is known and b may be calculated using Equation 4. However, for a single transmitter/receiver pair, the values of x and y cannot be solved unambiguously according to Equation 3 for the position 300c or for any other position on the ellipse 305.

Figure 5A:
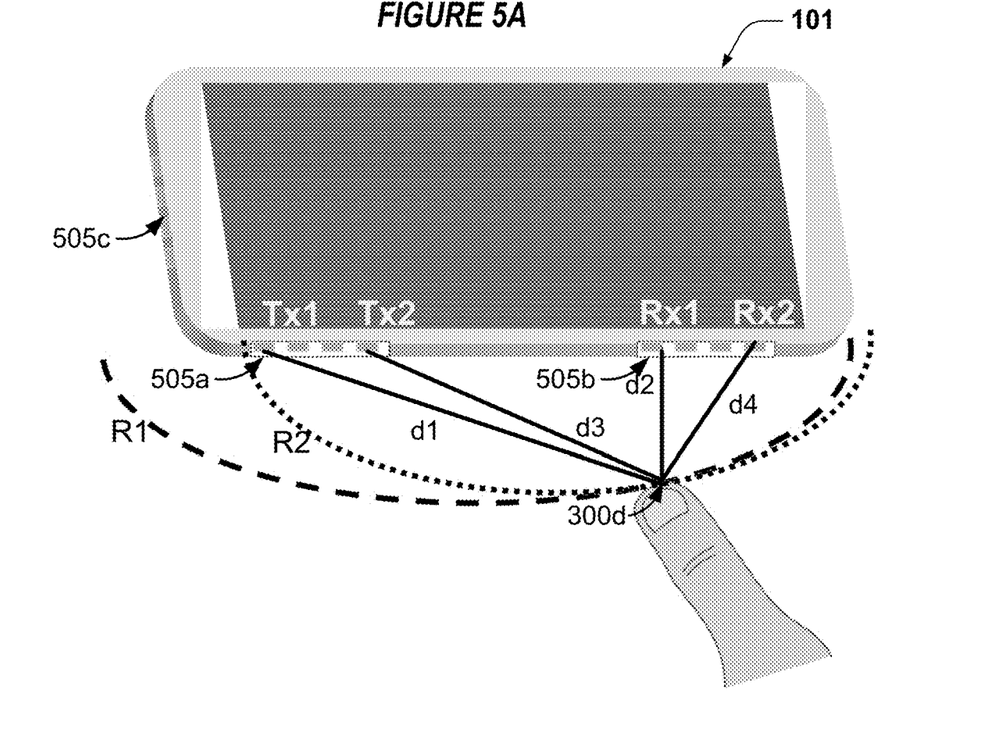
FIG. 5A shows an example of using more than one transmitter/receiver pair to determine an object position in two dimensions.

FIG. 5A shows an example of using more than one transmitter/receiver pair to determine an object position in two dimensions. According to this implementation, the apparatus 101 is a cellular telephone. In this example, antenna module 505a of the apparatus 101 includes transmitters Tx1 and Tx2, and antenna module 505b includes receivers Rx1 and Rx2. According to this example, the apparatus 101 also includes antenna module 505c, as well as other antenna modules that are not visible in FIG. 5A. In alternative implementations, the apparatus 101 may include more or fewer elements and/or differently configured elements. Some such implementations will be described below.

By using two transmitter/receiver pairs to obtain two round-trip times for reflections from an object proximate the apparatus, one can resolve object position ambiguity in two dimensions. According to some implementations, the second round-trip time $RTT_2$ may be obtained within a threshold time of obtaining the first round-trip time $RTT_1$. The threshold time may, in some examples, be in the range of 1 millisecond or less. In one example, the threshold time may be one hundred microseconds. In other examples, the threshold time may be hundreds of microseconds, e.g., two hundred microseconds, five hundred microseconds, eight hundred microseconds, etc. In another implementation, the threshold time may be one millisecond. In other examples, the threshold time may be greater than one millisecond but less than 10 milliseconds. In the example shown in FIG. 5A, the elliptical path $R1 = c \cdot RTT_1 = d1+d2$. Similarly, the elliptical path $R2 = c \cdot RTT_2 = d3+d4$. The position 300d of the object, or reflector, may be unambiguously determined in two dimensions as the point at which the elliptical path R1 intersects with the elliptical path R2.

Figure 5B:
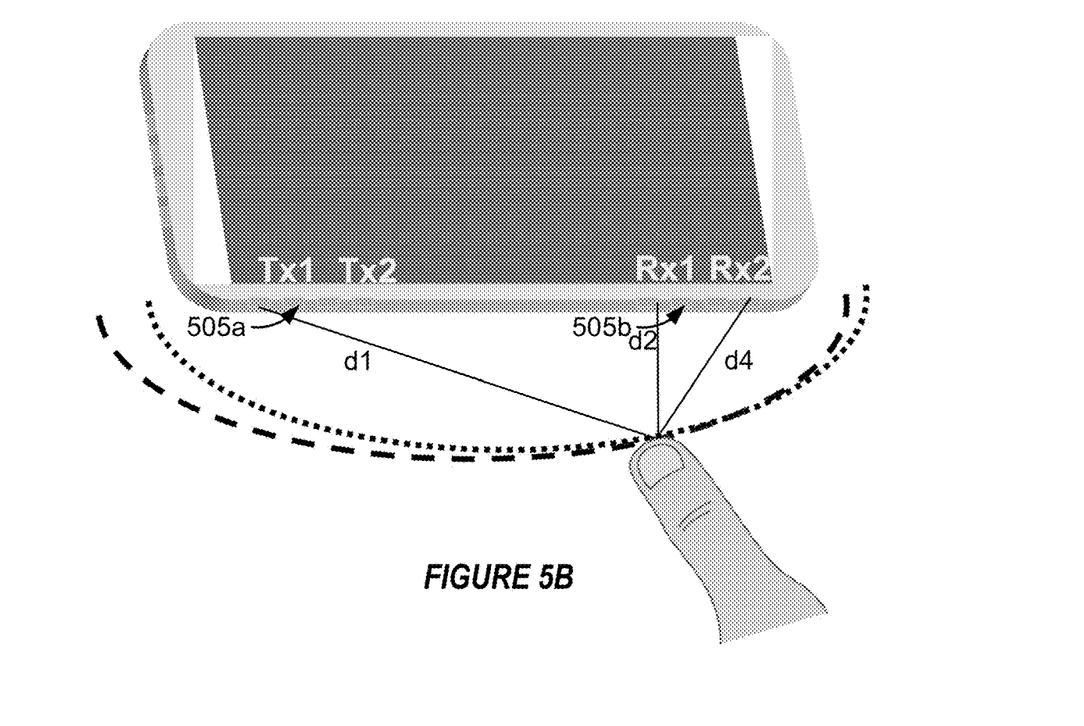
FIG. 5B shows an alternative example of using more than one transmitter/receiver pair to determine an object position in two dimensions.

FIG. 5B shows an alternative example of using more than one transmitter/receiver pair to determine an object position in two dimensions. In this example, one transmitter/receiver pair includes transmitter Tx1 of the antenna module 505a and receiver Rx1 of the antenna module 505b. Another transmitter/receiver pair includes transmitter Tx1 of the antenna module 505a and receiver Rx2 of the antenna module 505b.

In another example of using more than one transmitter/receiver pair to determine an object position in two dimensions, one transmitter/receiver pair may include transmitter Tx1 of the antenna module 505a and receiver Rx1 of the antenna module 505b. Another transmitter/receiver pair includes transmitter Tx2 of the antenna module 505a and receiver Rx1 of the antenna module 505b.

Figure 6:
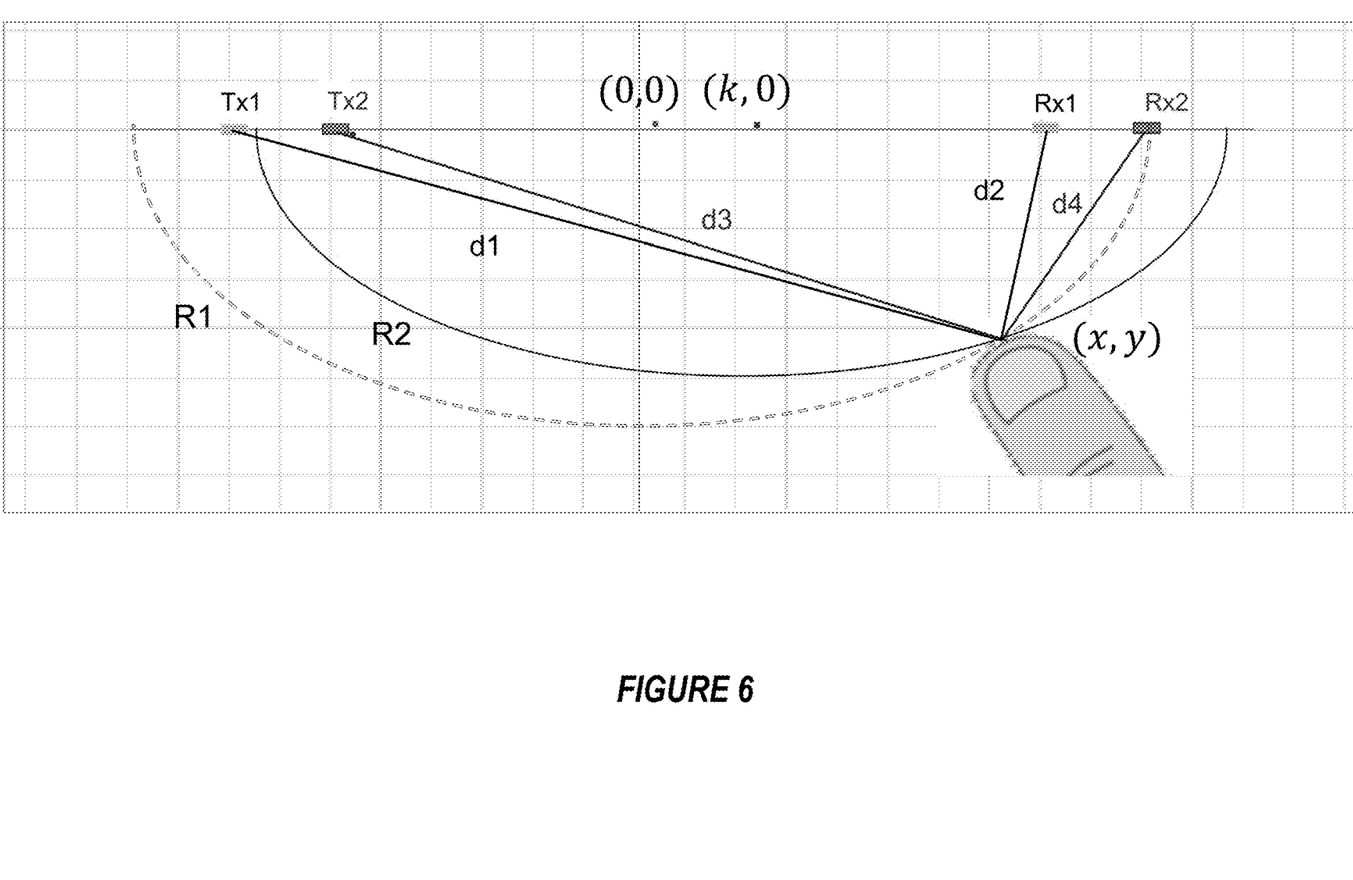
FIG. 6 shows a simplified version of the implementation depicted in FIG. 5A.

FIG. 6 shows a simplified version of the implementation depicted in FIG. 5A. In addition to showing the origin (0,0), which is the midpoint between transmitter Tx1 and receiver Rx1, FIG. 6 also shows (k,0), which is the midpoint between transmitter Tx2 and receiver Rx2. Accordingly, the ellipse R1 may be expressed via Equation 3 and the ellipse R2 may be expressed as follows:

$$\frac{(x-k)^2}{a'^2} + \frac{y^2}{b'^2} = 1 \quad \text{(Equation 5)}$$

In Equation 5, α' represents the semi-major axis of the ellipse R2 and b' represents the semi-minor axis of the ellipse R2. Where ellipses R1 and R2 intersect, Equation 5 equals Equation 3:

$$\frac{x^2}{a^2} + \frac{y^2}{b^2} = \frac{(x-k)^2}{a'^2} + \frac{y^2}{b'^2} \quad \text{(Equation 6)}$$

Because α, b, α', b', and k are known, the 2 intersection points (x,y) can be readily calculated. For example, suppose that c=4 and k=1 due to the dimensions of a particular apparatus. Moreover, suppose that for a particular reflector (x,y) location, d1+d2=10. Based on Equation 2, this means that α=5. Based on Equation 4, if α=5 and c=4, this means that b=3.

Suppose further that for that same reflector (x,y) location, d3+d4=9.4 Based on Equation 2, this means that α'=4.7. Based on Equation 4, if α'=4.7 and c=4, this means that b'=2.5. Therefore, according to Equation 6, the intersections of ellipses R1 and R2 may be obtained:

$$\frac{x^2}{5^2} + \frac{y^2}{3^2} = \frac{(x-1)^2}{4.7^2} + \frac{y^2}{2.5^2}$$

The two real roots of the equation are (3.6, −2.1) and (3.6, 2.1). Because the second, positive root indicates a point inside the apparatus, it can be concluded that the reflector is located at (3.6, −2.1) in this example.

Using additional transmitter/receiver pairs can resolve the position ambiguity in three dimensions. For example, in some implementations antenna modules may be placed on the front and/or back surface of an apparatus rather than its sides. In such instances, $R1 = c \cdot RTT_1 = d1 + d2$ should be considered to define a three-dimensional ellipsoidal shape. According to some implementations, a control system of an apparatus may be configured for determining a first ellipsoid based on a first round-trip time for a first reflection from an object proximate the apparatus. The control system may be configured for determining a second ellipsoid based on a second round-trip time for a second reflection from the object. The control system may be configured for determining an intersection of the first ellipsoid and the second ellipsoid. The control system may be configured for determining the position of the object based, at least in part, on the intersection of the first ellipsoid and the second ellipsoid.

Figure 7A:
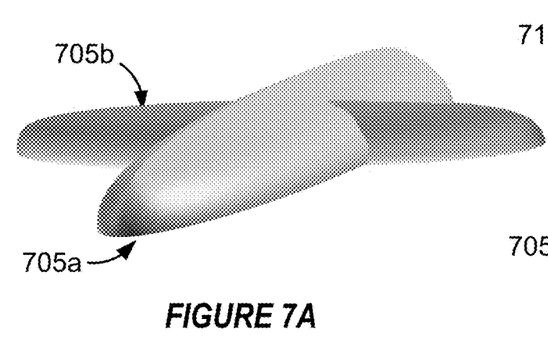
FIGS. 7A and 7B show two intersecting ellipsoids according to one example.
Figure 7B:
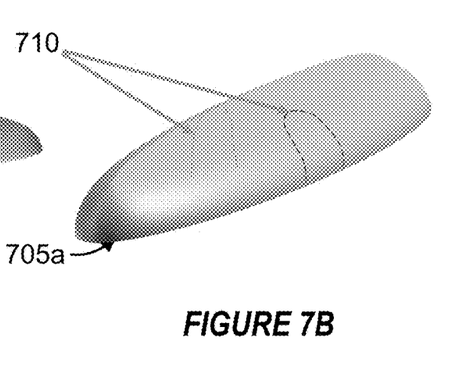

However, determining the position of the object may require more than determining the intersection of the first ellipsoid ellipse and the second ellipsoid. FIGS. 7A and 7B show two intersecting ellipsoids according to one example. In FIG. 7A, both of the intersecting ellipsoids, ellipsoid 705*a* and 705*b*, are shown. In FIG. 7B, only ellipsoid 705*a* and the two ellipses 710 defined by the intersection with ellipsoid 705*b* are shown. As indicated in FIG. 7B, merely determining the intersection of the ellipsoid 705*a* and the ellipsoid 705*b* is not sufficient for determining the precise position of a reflecting object in three dimensions. By using only two round-trip times for two reflections from the object, the position of the object is only constrained to be somewhere on the ellipses 710.

Accordingly, some implementations may involve obtaining, via a third transmitter/receiver pair, a third round-trip time for a third reflection from the object. Such implementations also may involve determining the position of the object based, at least in part, on the first round-trip time, the second round-trip time and the third round-trip time. For example, some implementations involve determining a third ellipsoid based on the third round-trip time and determining an intersection of the first ellipsoid, the second ellipsoid and the third ellipsoid. The position of the object may be determined, at least in part, according to the intersection of the first ellipsoid, the second ellipsoid and the third ellipsoid.

Figure 7C:
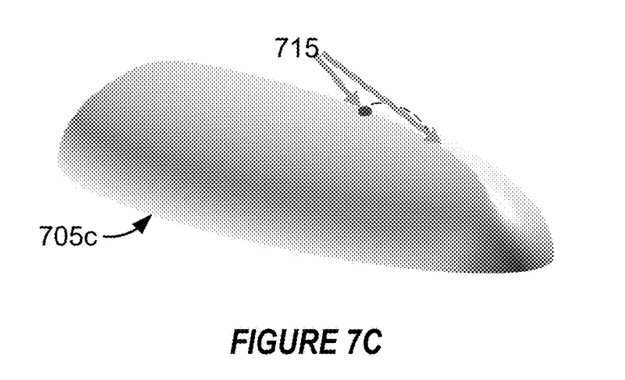
FIG. 7C shows an example of a third ellipsoid and its intersection points with the ellipsoids shown in FIGS. 7A and 7B.

FIG. 7C shows an example of a third ellipsoid and its intersection points with the ellipsoids shown in FIGS. 7A and 7B. Here, the ellipsoid 705*c* is shown, as well as the intersection points 715 with the ellipsoids 705*a* and 705*b*. Because the intersection of three ellipsoids based on three round-trip times from a reflecting object does not unambiguously determine the position of the object, some implementations may involve obtaining, via a fourth transmitter/receiver pair, a fourth round-trip time for a fourth reflection from the object. Such implementations also may involve determining the position of the object based, at least in part, on the first round-trip time, the second round-trip time, the third round-trip time and the fourth round-trip time. For example, some implementations involve determining a fourth ellipsoid based on the fourth round-trip time and determining an intersection of the first ellipsoid, the second ellipsoid, the third ellipsoid and the fourth ellipsoid. The position of the object may be unambiguously determined according to the intersection of the first ellipsoid, the second ellipsoid the third ellipsoid and the fourth ellipsoid.

However, it may be observed that the intersection points 715 are often relatively close to one another, e.g., within 1 cm of each other, within 5 mm of each other, or less in some instances. Therefore, even though the intersection of three ellipsoids based on three round-trip times from a reflecting object does not unambiguously determine the position of the object, some alternative implementations may not involve determining a fourth round-trip time for a fourth reflection from the object, etc., as described above. Instead, some such alternative implementations may involve determining the approximate position of the object according to the intersection points of the first ellipsoid, the second ellipsoid and the third ellipsoid. For example, a control system may be configured to determine that the intersection of the first ellipsoid, the second ellipsoid and the third ellipsoid indicate two potential positions of the object. The control system may, in some implementations, be configured to determine a midpoint between the two potential positions of the object and to determine that the midpoint is the position of the object, or the approximate position of the object.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus comprising:
a plurality of transmitter/receiver pairs configured for transmitting and receiving mmWave radar, one or more of the transmitter/receiver pairs including a first transmitter residing in a first antenna module and a first receiver residing in a second antenna module; and
a control system configured for:
obtaining, via a first transmitter/receiver pair, a first round-trip time for a first reflection from an object proximate the apparatus;
obtaining, via a second transmitter/receiver pair, a second round-trip time for a second reflection from the object; and
determining a position of the object based, at least in part, on the first round-trip time and the second round-trip time.

2. The apparatus of claim 1, wherein the control system is configured for:
determining a first ellipse based on the first round-trip time;
determining a second ellipse based on the second round-trip time; and
determining an intersection of the first ellipse and the second ellipse, wherein the position of the object is based, at least in part, on the intersection of the first ellipse and the second ellipse.

3. The apparatus of claim 1, wherein the control system is configured for:
obtaining, via a third transmitter/receiver pair, a third round-trip time for a third reflection from the object; and
determining the position of the object based, at least in part, on the first round-trip time, the second round-trip time and the third round-trip time.

4. The apparatus of claim 3, wherein the control system is configured for:
determining a first ellipsoid based on the first round-trip time;
determining a second ellipsoid based on the second round-trip time;
determining a third ellipsoid based on the third round-trip time; and
determining an intersection of the first ellipsoid, the second ellipsoid and the third ellipsoid, wherein the position of the object is based, at least in part, on the intersection of the first ellipsoid, the second ellipsoid and the third ellipsoid.

5. The apparatus of claim 4, wherein the intersection of the first ellipsoid, the second ellipsoid and the third ellipsoid indicates two potential positions of the object and wherein the control system is configured for determining a midpoint between the two potential positions of the object and for determining that the midpoint is the position of the object.

6. The apparatus of claim 1, wherein the first antenna module includes two or more transmitters and wherein the second antenna module includes two or more receivers.

7. The apparatus of claim 1, wherein the first transmitter/receiver pair comprises a first transmitter and a first receiver and wherein the second transmitter/receiver pair comprises the first transmitter and a second receiver.

8. The apparatus of claim 1, wherein the first transmitter/receiver pair comprises a first transmitter and a first receiver and wherein the second transmitter/receiver pair comprises a second transmitter and the first receiver.

9. The apparatus of claim 1, wherein the control system is configured for controlling one or more of the transmitter/receiver pairs for communication with one or more devices over a network.

10. The apparatus of claim 1, wherein the apparatus comprises a cellular telephone.

11. A method, comprising:
obtaining, via a first transmitter/receiver pair of an apparatus, a first round-trip time for a first reflection from an object proximate the apparatus;
obtaining, via a second transmitter/receiver pair of the apparatus, a second round-trip time for a second reflection from the object, wherein obtaining at least one of the first round-trip time or the second round-trip time involves transmitting from a first antenna module and receiving via a second antenna module; and
determining a position of the object based, at least in part, on the first round-trip time and the second round-trip time.

12. The method of claim 11, further comprising:
determining a first ellipse based on the first round-trip time;
determining a second ellipse based on the second round-trip time; and
determining an intersection of the first ellipse and the second ellipse, wherein the position of the object is based, at least in part, on the intersection of the first ellipse and the second ellipse.

13. The method of claim 11, further comprising:
obtaining, via a third transmitter/receiver pair of the apparatus, a third round-trip time for a third reflection from the object; and
determining the position of the object based, at least in part, on the first round-trip time, the second round-trip time and the third round-trip time.

14. The method of claim 13, further comprising:
determining a first ellipsoid based on the first round-trip time;
determining a second ellipsoid based on the second round-trip time;
determining a third ellipsoid based on the third round-trip time; and
determining an intersection of the first ellipsoid, the second ellipsoid and the third ellipsoid, wherein the position of the object is based, at least in part, on the intersection of the first ellipsoid, the second ellipsoid and the third ellipsoid.

15. The method of claim 14, wherein the intersection of the first ellipsoid, the second ellipsoid and the third ellipsoid indicates two potential positions of the object and wherein the method further comprises determining a midpoint between the two potential positions of the object and determining that the midpoint is the position of the object.

16. The method of claim 11, wherein obtaining at least one of the first round-trip time or the second round-trip time comprises transmitting from a first antenna module that includes two or more transmitters and receiving via a second antenna module that includes two or more receivers.

17. The method of claim 11, wherein obtaining the first round-trip time comprises transmitting from a first transmitter of a first antenna module and receiving via a first receiver of a second antenna module and wherein obtaining the second round-trip time comprises transmitting from the first transmitter of the first antenna module and receiving via a second receiver of the second antenna module.

18. The method of claim 11, wherein obtaining the first round-trip time comprises transmitting from a first transmitter of a first antenna module and receiving via a first receiver of the first antenna module and wherein obtaining the second round-trip time comprises transmitting from a first transmitter of a second antenna module and receiving via the first receiver of the first antenna module.

19. The method of claim 11, further comprising controlling one or more of the transmitter/receiver pairs for communication with one or more devices over a network.

20. The method of claim 11, further comprising controlling the apparatus to provide cellular telephone functionality.

21. The method of claim 11, wherein at least one of the first reflection or the second reflection comprises a reflection of mmWave radar.

22. The method of claim 11, wherein the second round-trip time is obtained within a threshold time of obtaining the first round-trip time.

23. The method of claim 22, wherein the threshold time is in the range of one hundred microseconds to one millisecond.

24. An apparatus comprising:
a plurality of transmitter/receiver means for transmitting and receiving mmWave radar, one or more of the transmitter/receiver pairs including a first transmitter residing in a first antenna module and a first receiver residing in a second antenna module; and
control means for:
obtaining, via a first transmitter/receiver means, a first round-trip time for a first reflection from an object proximate the apparatus;
obtaining, via a second transmitter/receiver means, a second round-trip time for a second reflection from the object; and
determining a position of the object based, at least in part, on the first round-trip time and the second round-trip time.

25. The apparatus of claim 24, wherein the control means includes means for:
determining a first ellipse based on the first round-trip time;
determining a second ellipse based on the second round-trip time; and
determining an intersection of the first ellipse and the second ellipse, wherein the position of the object is based, at least in part, on the intersection of the first ellipse and the second ellipse.

26. One or more non-transitory media having software stored thereon, the software including instructions for controlling an apparatus to perform a method that comprises:
obtaining, via a first transmitter/receiver pair of the apparatus, a first round-trip time for a first reflection from an object proximate the apparatus;

obtaining, via a second transmitter/receiver pair of the apparatus, a second round-trip time for a second reflection from the object, wherein obtaining at least one of the first round-trip time or the second round-trip time involves transmitting from a first antenna module and receiving via a second antenna module; and determining a position of the object based, at least in part, on the first round-trip time and the second round-trip time.

27. The one or more non-transitory media of claim 26, wherein the method further comprises:
determining a first ellipse based on the first round-trip time;
determining a second ellipse based on the second round-trip time; and
determining an intersection of the first ellipse and the second ellipse, wherein the position of the object is based, at least in part, on the intersection of the first ellipse and the second ellipse.

28. The one or more non-transitory media of claim 26, wherein the method further comprises:
obtaining, via a third transmitter/receiver pair of the apparatus, a third round-trip time for a third reflection from the object; and
determining the position of the object based, at least in part, on the first round-trip time, the second round-trip time and the third round-trip time.

29. An apparatus comprising:
a plurality of transmitter/receiver pairs configured for transmitting and receiving mmWave radar; and
a control system configured for:
obtaining, via a first transmitter/receiver pair, a first round-trip time for a first reflection from an object proximate the apparatus;
determining a first ellipse based on the first round-trip time;
obtaining, via a second transmitter/receiver pair, a second round-trip time for a second reflection from the object;
determining a second ellipse based on the second round-trip time;
determining an intersection of the first ellipse and the second ellipse; and
determining a position of the object based, at least in part, on the first round-trip time, the second round-trip time and the intersection of the first ellipse and the second ellipse.

30. A method, comprising:
obtaining, via a first transmitter/receiver pair of an apparatus, a first round-trip time for a first reflection from an object proximate the apparatus;
determining a first ellipse based on the first round-trip time;
obtaining, via a second transmitter/receiver pair of the apparatus, a second round-trip time for a second reflection from the object;
determining a second ellipse based on the second round-trip time;
determining an intersection of the first ellipse and the second ellipse; and
determining a position of the object based, at least in part, on the first round-trip time, the second round-trip time and the intersection of the first ellipse and the second ellipse.

31. An apparatus comprising:
a plurality of transmitter/receiver means for transmitting and receiving mmWave radar; and control means for:
obtaining, via a first transmitter/receiver pair, a first round-trip time for a first reflection from an object proximate the apparatus;
determining a first ellipse based on the first round-trip time;
obtaining, via a second transmitter/receiver pair, a second round-trip time for a second reflection from the object;
determining a second ellipse based on the second round-trip time;
determining an intersection of the first ellipse and the second ellipse; and
determining a position of the object based, at least in part, on the first round-trip time, the second round-trip time and the intersection of the first ellipse and the second ellipse.

32. One or more non-transitory media having software stored thereon, the software including instructions for controlling an apparatus to perform a method that comprises:
obtaining, via a first transmitter/receiver pair of an apparatus, a first round-trip time for a first reflection from an object proximate the apparatus;
determining a first ellipse based on the first round-trip time;
obtaining, via a second transmitter/receiver pair of the apparatus, a second round-trip time for a second reflection from the object;
determining a second ellipse based on the second round-trip time;
determining an intersection of the first ellipse and the second ellipse; and
determining a position of the object based, at least in part, on the first round-trip time, the second round-trip time and the intersection of the first ellipse and the second ellipse.

33. A method, comprising:
obtaining, via a first transmitter/receiver pair of an apparatus, a first round-trip time for a first reflection from an object proximate the apparatus;
obtaining, via a second transmitter/receiver pair of the apparatus, a second round-trip time for a second reflection from the object, wherein the second round-trip time is obtained within a threshold time of obtaining the first round-trip time; and
determining a position of the object based, at least in part, on the first round-trip time and the second round-trip time.

34. An apparatus comprising:
a plurality of transmitter/receiver pairs configured for transmitting and receiving mmWave radar; and
a control system configured for:
obtaining, via a first transmitter/receiver pair, a first round-trip time for a first reflection from an object proximate the apparatus;
obtaining, via a second transmitter/receiver pair, a second round-trip time for a second reflection from the object, wherein the second round-trip time is obtained within a threshold time of obtaining the first round-trip time; and
determining a position of the object based, at least in part, on the first round-trip time and the second round-trip time.

35. An apparatus comprising:
a plurality of transmitter/receiver means for transmitting and receiving mmWave radar; and
control means for:

obtaining, via a first transmitter/receiver means, a first round-trip time for a first reflection from an object proximate the apparatus;

obtaining, via a second transmitter/receiver means, a second round-trip time for a second reflection from the object, wherein the second round-trip time is obtained within a threshold time of obtaining the first round-trip time; and determining a position of the object based, at least in part, on the first round-trip time and the second round-trip time.

36. One or more non-transitory media having software stored thereon, the software including instructions for controlling an apparatus to perform a method that comprises:

obtaining, via a first transmitter/receiver pair of the apparatus, a first round-trip time for a first reflection from an object proximate the apparatus;

obtaining, via a second transmitter/receiver pair of the apparatus, a second round-trip time for a second reflection from the object, wherein the second round-trip time is obtained within a threshold time of obtaining the first round-trip time; and determining a position of the object based, at least in part, on the first round-trip time and the second round-trip time.

* * * * *